United States Patent [19]

Batten

[11] Patent Number: 4,983,284
[45] Date of Patent: Jan. 8, 1991

[54] HEATED SUMP ASSEMBLY FOR A GREASE/OIL SEPARATOR

[75] Inventor: William C. Batten, Asheboro, N.C.

[73] Assignee: Thermaco, inc., Asheboro, N.C.

[21] Appl. No.: 407,068

[22] Filed: Sep. 14, 1989

[51] Int. Cl.$^5$ .............................................. C02F 1/40
[52] U.S. Cl. ..................................... 210/187; 210/523; 210/538
[58] Field of Search ............... 210/187, 521, 523, 538, 210/923, 776

[56] References Cited

U.S. PATENT DOCUMENTS

| | | | |
|---|---|---|---|
| 2,825,422 | 3/1958 | Schoenfeld | 210/187 |
| 2,935,197 | 3/1960 | Marple | 210/187 |
| 3,318,448 | 5/1967 | Tryer | 210/187 |
| 3,907,682 | 9/1975 | Bassett | 210/187 |
| 4,235,726 | 11/1980 | Shimko | 210/523 |

FOREIGN PATENT DOCUMENTS 55-47104 4/1980 Japan .

Primary Examiner—Richard V. Fisher
Assistant Examiner—Christoper Upton
Attorney, Agent, or Firm—Rhodes, Coats & Bennett

[57] ABSTRACT

A grease/oil separator of the type primarily used in industry for the removal of grease/oil contaminants from water flowing from a restaurant or like business to the conventional sewer facilities and being of the type which includes a heater structure mounted within a receiving container. A heat conductive wing defines a heat sink and is secured to an under portion of a trough or receiving portion of a containment removal sump. The heat sink is dimensioned and configured to extend into submerged relation within the liquid reservoir of the receiving container and transfer heat, through conductivity therefrom to the heat sump so as to maintain the heat sump at a minimum predetermined temperature sufficient to prevent grease/oil contaminants from solidifying and clogging the removal sump.

9 Claims, 1 Drawing Sheet

FIG. 1
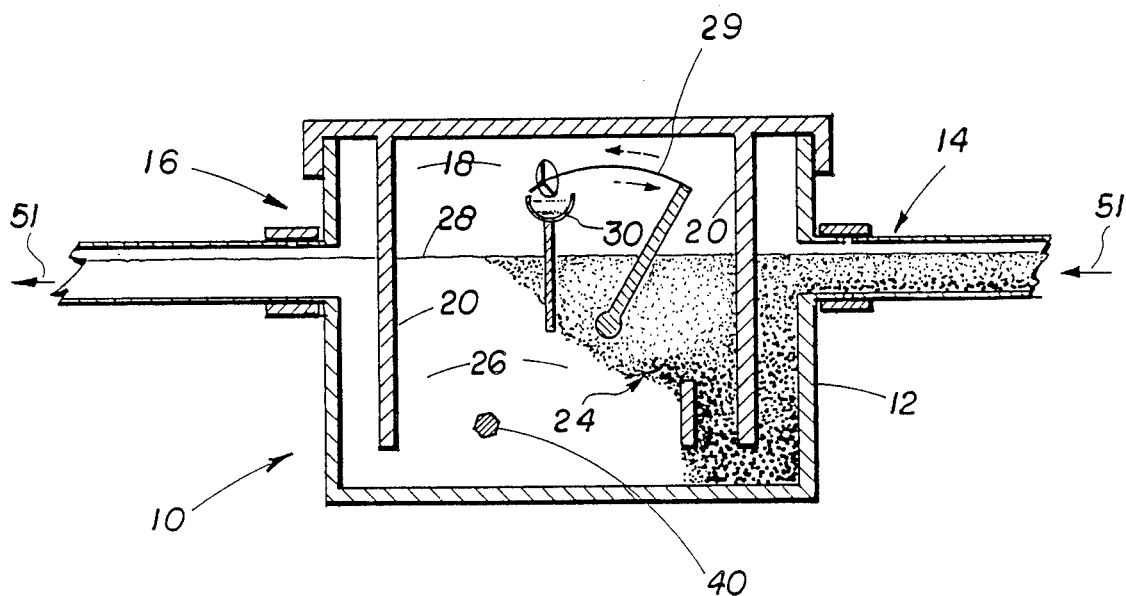
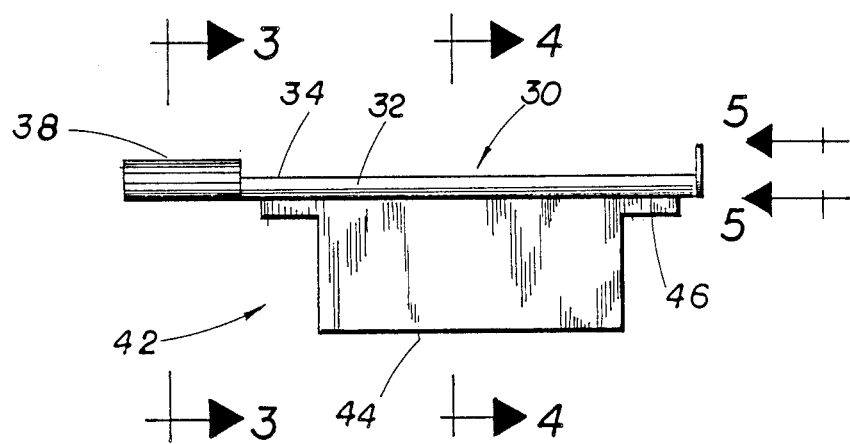
FIG. 2
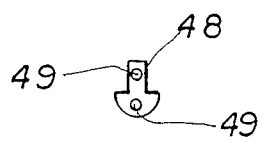
FIG. 5
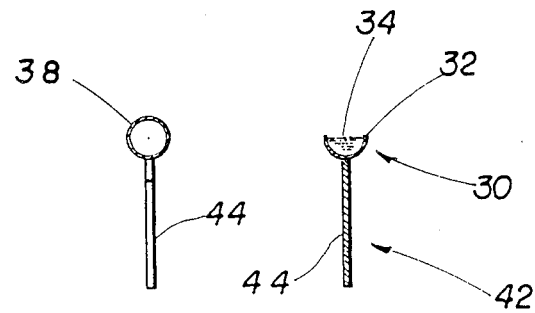
FIG. 3    FIG. 4

HEATED SUMP ASSEMBLY FOR A GREASE/OIL SEPARATOR

BACKGROUND OF THE INVENTION

1. Field of the Invention

This invention relates to a grease/oil separator assembly of the type which maintains a collected liquid reservoir having grease/oil contaminants therein at a predetermined temperature by an immersion heater and further which incorporates a heat transfer structure to conduct heat from the liquid reservoir to a disposal, outlet sump for the contaminants.

2. Description of the Prior Art

Many businesses, such as but not limited to restaurants and the like, incorporate the use of a grease or oil separator assembly structured to be inserted within conventional plumbing facilities so as to receive "contaminated" waste water. The separator assembly is specifically structured to remove contaminants such as grease, oils, fats, etc. for disposal separate from emptying such contaminated liquid into the conventional sewer facilities. One type of separator assembly enjoying commercial popularity is commercially known as Big Dipper Automatic Grease/Oil Removal Units by Thermaco, Inc. Typically, units of this type include a skimming structure or means for removing, on a substantially continuous basis, the grease or oil contaminants from a liquid reservoir maintained within a receiving container which receives the contaminated liquid discharge. The skimmer means associated with units of this type separate the contaminants from the liquid reservoir and deliver them to a disposal sump assembly having its own outlet for delivery of the contaminants, once separated, to a storage facility for separate removal and segregation from the conventional sewage system. In order to facilitate separation and collection of the contaminants from the liquid reservoir, an immersion heater is utilized to maintain the liquid reservoir at a minimum predetermined temperature, preferably 130 degrees Fahrenheit.

Animal fats, vegetable oils, etc. such as coconut and palm oils as well as hydrogenated vegetable oils such as margarine, all solidify at approximately 95 to 108 degrees Fahrenheit. In some cases over time, a build-up of solidified fats/oils occurs most prevalently in the outlet portion of the sump assembly. This of course renders the outlet sump unuseable since it becomes clogged and therefore unable to serve as a transport for the removed contaminants. While the provision of an immersion heater or like heating means within the liquid reservoir aids in the separation and collection of contaminants, such heat does not normally benefit the receiving portion or trough of the receiving sump or outlet associated therewith.

Since it is recognized that grease/oil contaminants of the type referred to herein solidify at the above set forth temperature, the problem of clogging the contaminant outlet associated with the sump assembly would be overcome if the contaminants, once having reached the sump assembly could also be maintained above the solidifying temperature range.

Accordingly, there is a need in this industry for preventing clogging of the removal sump for contaminants due to the solidification of such contaminants during the removal process.

SUMMARY OF THE INVENTION

The present invention relates to a separator assembly and specifically is directed to a structure which prevents clogging of the outlet sump disposed and structured to receive contaminants from a collected and contained liquid reservoir for separate disposal thereof. Clogging of the outlet structure associated with the sump assembly is prevented by maintaining the grease, oil, fat, or like contaminants above a certain temperature range normally associated with the solidification of such contaminants.

More specifically, the present invention is directed to a separator assembly having a receiving container which includes an inlet and an outlet. The inlet is connected, through conventional plumbing, to the discharge of liquid contaminated with grease, oils, fats, etc. A liquid reservoir is therefore maintained on the interior of the collection container and the subject separator assembly is specifically structured to remove the contaminants from the water or other liquid material portion of the reservoir prior to the discharge thereof to conventional sewage or plumbing facilities.

The separator assembly of the present invention therefore comprises a skimming means which operates on a substantially continuous basis to remove the collected contaminants from the liquid reservoir maintained within the receiving container and deliver such contaminants, segregated from the non-contaminated portion of the liquid reservoir, into a receiving or collecting sump assembly. A contaminant out-flow is associated with the sump assembly and directs the contaminant material delivered thereto to a separate storage facility for disposal separate from the conventional sewage facilities.

In order to facilitate separation of the contaminants from the remaining liquid portion of the liquid reservoir, a heating means, preferably in the form of an immersion heater is disposed within the liquid reservoir. The heating means is structured to maintain the liquid reservoir at a predetermined temperature of substantially 130 degrees Fahrenheit.

An important feature of the present invention is the provision of a heat transfer means connected to the sump assembly in direct heat transferring relation thereto. The disposition and overall dimension of the heat transfer means is such as to be at least partially submerged into the heated liquid reservoir so as to collect heat therefrom and transfer such collected heat, through conductivity, to the receiving portion of the sump assembly. The sump assembly is therefore maintained at a minimum predetermined temperature wherein such temperature is specifically above the temperature range at which grease, oil, fat, etc. normally solidify. More specifically, such temperature range is recognized in the industry as being substantially between 95 and 108 degrees Fahrenheit.

Accordingly, the heat transfer means is specifically disposed and structured to transfer sufficient heat from the liquid reservoir to maintain the surface temperature of the collection portion of the sump assembly above the aforementioned, predetermined temperature range, thereby preventing solidification of any of the collected contaminants. Such contaminants will therefore be maintained in a flowable, at least semi liquid state and clogging of the outlet associated with the sump assembly will thereby be prevented.

BRIEF DESCRIPTION OF THE DRAWINGS

For a fuller understanding of the nature of the present invention, reference should be had to the following detailed description taken in connection with the accompanying drawings in which:

FIG. 1 is a internal sectional view in partial cut-away of the assembly of the present invention.

FIG. 2 is a side elevation of one component of the embodiment of FIG. 1.

FIG. 3 is a sectional view along line 3—3 of FIG. 2.

FIG. 4 is a sectional view along line 4—4 of FIG. 2.

FIG. 5 is an end view along line 5—5 of FIG. 2.

Like reference numerals refer to like parts throughout the several views of the drawings.

DETAILED DESCRIPTION OF THE PREFERRED EMBODIMENT

As shown in the accompanying figures, the present invention relates to a grease/oil or like contaminant separator assembly generally indicated as 10 and including a receiving tank or container 12 having an inlet 14 and an outlet 16 both of which communicate with the interior 18 of the container 12. Contaminated liquid such as water or the like, enters the interior 18 of the receiving container 12 through the inlet 14. While the structure of the separator assembly 18 may vary, one embodiment including the type of separator referred to hereinafter includes internal baffles 20 and 22 associated respectively with the inlet and outlet as at 14 and 16 and disposed to facilitate separation and containment of the contaminant portion generally indicated as 24 from the water or remaining liquid portion 26 of the liquid reservoir retained within the container 12.

However, typical of the type of separator assembly 10 is the provision of a skimming means generally indicated as 29 which reciprocates continuously so as to remove the collected contaminant material 24 from the liquid reservoir 26 and deliver such material to a collecting, contaminant sump assembly generally indicated as 30. Operation of the skimmer is as described in U.S. Pat. No. 4,235,726 to Shimko. This operation is well known to those of ordinary skill in the art as characteristic of the above-mentioned BIG DIPPER automatic grease/oil removal units sold by Thermaco, Inc. Details of the sump assembly are shown in FIGS. 3-5 wherein the sump structure includes an elongated open ended trough 32 spaced substantially above the surface 28 of the liquid reservoir 26 and disposed relative to the skimmer assembly 29 so as to receive the collected contaminants therefrom. The contaminants therefore are deposited through the open upper side or end 34 into the trough and pass therefrom through a conduit 38 defining a contaminate outlet associated with the trough. The outlet 38 is connected to a separate storage or removal facility other than that to which the outlet means 16, associated with container 12, is connected. For example, the contaminant free liquid or water portion of the reservoir 26 may pass through the outlet means 16 to conventional sewage or plumbing facilities for disposal of waste in the normal fashion. However, due to the problems associated with the collection and disposal of contaminants of the type referred to herein, the contaminant outlet conduit 38 is connected for disposal and removal of the contaminants through other facilities other than conventional sewage or plumbing lines.

FIG. 5 is an end view of the assembly 30 and includes an end plate 48 having appropriate apertures as at 49 for the connection and provision of conventional connector elements such as screws or the like to facilitate mounting of the trough 32 in a fixed transverse position relative to the direction of flow of the material passing through the container 12 as indicated generally by the directional arrows 51 (see FIG. 1).

As set forth above, one common problem associated with the collection of contaminants in the receiving or trough portion 32 of the sump assembly 30 is the solidification of the contaminant particles and collection of such solidified particles along the trough or in the contaminant outlet 38. Once such accumulation occurs, the trough and/or outlet 32 and 38 respectively become clogged and therefore unuseable.

With reference to FIG. 1, one feature which facilitates separation of the contaminant free component or water portion 26 of the reservoir from the contaminant portion 24, is the maintenance of the liquid reservoir at a certain predetermined temperature by the existence of a heating means. Such heating means is shown in the embodiment of FIG. 1 to include an immersion heater 40 disposed in submerged relation on the interior of the container end within the reservoir. The structure and heating capacity of the heater 40 is such as to maintain the liquid reservoir 26 at least at a minimum temperature of substantially 130 degrees Fahrenheit. Once the liquid reservoir is maintained at this temperature, an important feature of the present invention is the provision of a heat transfer means generally indicated as 42 and connected in heat transferring and conducting relation to the sump assembly 30. More specifically, the heat transfer means 42 includes a wing member 44 having an upper longitudinal side or edge portion thereof as at 46 secured to and extending continuously along a major portion of the trough 32. The wing member 44 is formed of a heat conductive material and is preferably of a one-piece construction to facilitate heat conductivity therethrough. Preferably, the wing member has a planar configuration oriented transversely to a length of the tank 12 and is at least partially immersed therein. In addition, the wing member is preferably formed of a solid, heat conductive material with a corrosion resistant coating on the outer surface. In a preferred embodiment the heat conductive material is aluminum and the coating is nickel plating. Further as shown in FIGS. 2-4, the wing member 44 depends in supporting relation from the under portion of the trough 32 of the sump assembly 30 into at least partially submerged relation within the liquid reservoir 26. Accordingly, the maintenance of the liquid reservoir at at least a temperature of 130 degrees Fahrenheit and the cooperative heat conductive features of the wing member 44 serve to transfer heat from the liquid reservoir 26 to the trough 32 of the heat sump assembly 30 thereby allowing the surface temperature thereof to also be maintained at a minimum predetermined temperature. Such minimum predetermined temperature is preferably above the temperature range of 95 to 108 degrees Fahrenheit which is the temperature at which the contaminant particles will not solidify. Accordingly, as long as the surface temperature of the trough 32 of the sump assembly 30 is maintained above the "solidifying temperature", such contaminant particles will in fact not solidify and be maintained in a flowable state. The tendency for such particles to clog either the trough or the outlet 32 and 38 respectively is thereby eliminated or effectively reduced to the extent that clogging of the sump assembly is no longer a problem. In addition, no further energy need be expended since the immersion heater element 40 is utilized to maintain the liquid reservoir 26 at the aforementioned predetermined temperature of at least 130 degrees Fahrenheit.

Now that the invention has been described,

What is claimed is:

1. A grease/oil separator assembly designed for use in removing grease/oil contaminants from a water supply, said separator assembly comprising:
    a. a separator tank including an inlet and an outlet disposed in spaced relation to one another and in fluid communicating relation with an interior of the tank and a liquid reservoir therein said liquid reservoir being constructed and arranged to have an upper liquid surface level,
    b. a skimming means mounted within said separator tank and structured for skimming grease/oil contaminants from an upper level of the liquid reservoir,
    c. a sump assembly disposed within said separator tank above said upper surface level to receive collected grease/oil contaminants from said skimming means and including a contaminant receiving portion and a contaminant outlet,
    d. heater means mounted within said separator tank and disposed in immersed relation within the liquid reservoir for heating the reservoir to at least a predetermined temperature,
    e. heat transfer means secured in heat conducting relation to said sump assembly and disposed in heat receiving engagement within the liquid reservoir and structured for transferring heat from the liquid reservoir to said sump assembly wherein said heat transfer means comprises a heat sink structure in the form of a wing member of substantially solid, one-piece construction secured along an upper portion thereof to said contaminant receiving portion and dimensioned to extend from a connection with said sump assembly into submerged, heat receiving relation within said liquid reservoir, and
    f. said heat transfer means disposed and structured to maintain the sump assembly above a predetermined temperature from heat collected from the liquid reservoir.

2. An assembly as in claim 1 wherein said sump assembly comprises an elongated trough including an open sided construction disposed to receive contaminants from said skimming means, said trough connected in fluid communication with said contaminant outlet.

3. An assembly as in claim 2 wherein said heat sink structure comprises a substantially elongated configuration extending continuously along a majority of the length of the under portion of said trough.

4. An assembly as in claim 3 wherein said wing member is further defined by a planar configuration oriented transversely to a length of said separator tank and said liquid reservoir and being at least partially immersed therein.

5. An assembly as in claim 4 wherein said wing member is formed of a solid, heat conductive material and includes a corrosion resistant coating disposed over an outer exposed surface thereof.

6. An assembly as in claim 5 wherein said wing member is formed from an aluminum material having a nickel plating coated over the outer surface thereof.

7. An assembly as in claim 2 wherein one longitudinal edge of said wing member is secured continuously along an under portion of said trough and extends along at least a major portion of the length of said trough.

8. An assembly as in claim 1 wherein said heater means comprises an immersion heater structured to maintain the liquid reservoir at a temperature of at least substantially 130 degrees Fahrenheit.

9. An assembly as in claim 1 wherein said heating means and said heat transfer means are cooperatively disposed and structured to maintain a surface temperature of said sump assembly at least substantially 95 degrees Fahrenheit.

* * * * *